(12) United States Patent
Medina et al.

(10) Patent No.: US 6,975,581 B1
(45) Date of Patent: Dec. 13, 2005

(54) VLAN PROTOCOL

(75) Inventors: Eitan Medina, Ramat Hasharon (IL); David Shemla, Kfar Havradim (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 346 days.

(21) Appl. No.: 10/293,098

(22) Filed: Nov. 12, 2002

Related U.S. Application Data (63) Continuation of application No. 09/348,864, filed on Jul. 7, 1999, now abandoned.

(30) Foreign Application Priority Data

Jul. 8, 1998  (IL)  ..................................... 125272

(51) Int. Cl.[7] .................. H04L 12/56; H04L 12/28; H04J 3/26; G06F 15/173
(52) U.S. Cl. .................... 370/40 D; 370/390; 370/392; 370/396; 370/395.31; 370/395.32; 370/432; 709/243
(58) Field of Search ................. 370/400, 230, 370/235, 389–390, 392, 396, 395.31, 423, 370/432, 465, 395.32; 709/243

(56) References Cited

U.S. PATENT DOCUMENTS

| | | | |
|---|---|---|---|
| 5,740,171 A | 4/1998 | Mazzola et al. | |
| 5,852,607 A | 12/1998 | Chin | |
| 5,923,660 A | 7/1999 | Shemla et al. | |
| 6,085,238 A * | 7/2000 | Yuasa et al. | 709/223 |
| 6,147,995 A | 11/2000 | Dobbins et al. | |
| 6,266,705 B1 * | 7/2001 | Ullum et al. | 709/238 |

* cited by examiner

*Primary Examiner*—Chi Pham
*Assistant Examiner*—Ronald Abelson (57) ABSTRACT

A method of broadcasting a packet to the ports belonging to one VLAN of a network, whereas the network has multiple network switches. Each network switch has its own local ports and a local VLAN table. Each local VLAN table stores local port membership of its network switch, and switch membership per VLAN identifier. The local VLAN table is accessed by a VLAN identifier which is stored in the packet, and retrieves the local port membership and switch membership associated with the VLAN identifier. A copy of the packet is provided to each local port and to each switch retrieved from said local VLAN table.

17 Claims, 9 Drawing Sheets

| VLAN id | Port Membership |
|---|---|
| 1 | (P1,S1)(P4,S1)(P2,S2) (P3,S2)(P4,S3)(P5,S3) |
| 2 | (P1,S1)(P3,S1)(P5,S1) |
| 3 | (P2,S2)(P4,S2)(P1,S3) (P3,S3) |
| 4 | (P4,S1)(P1,S2)(P3,S2) |

Width: 256, Height: 4k

16 → VLAN id column; 18 → Port Membership column; 10 → table

FIG. 5A

Switch 1 — 20A

| VLAN id | Local Port | Other Switches |
|---|---|---|
| 1 | P1 ; P4 | S2 ; S3 |
| 2 | P1 ; P3 ; P5 | |
| 3 | | S2 ; S3 |
| 4 | P4 | S2 |

20 → VLAN id; 24 → Local Port; 26 → Other Switches

FIG. 5B

Switch 2 — 20B

| VLAN id | Local Port | Other Switches |
|---|---|---|
| 1 | P2 ; P3 | S1 ; S3 |
| 2 |  | S1 |
| 3 | P2 ; P4 | S3 |
| 4 | P1 ; P3 | S1 |

FIG. 5C

Switch 3 — 20C

| VLAN id | Local Port | Other Switches |
|---|---|---|
| 1 | P4 ; P5 | S1 ; S2 |
| 2 |  | S1 |
| 3 | P1 ; P3 | S2 |
| 4 |  | S1 ; S2 |

VLAN PROTOCOL

CONTINUING DATA

This application is a continuation of application Ser. No. 09/348,864 filed on Jul. 7, 1999, now abandoned, the contents of which are incorporated herein by reference.

FIELD OF THE INVENTION

The present invention relates to virtual local area networks (VLAN) protocols in general.

BACKGROUND OF THE INVENTION

A network switch creates a local area network (LAN) among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data, which it receives from the units (end node or network switch) connected to it while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory of the switch or written over.

Each end node has an address, known as a media access control (MAC) address, which is unique to that end node. Each switch maintains an address-table, where each entry is composed of a MAC address and at least its device and port location on that end node.

Network switches can be arranged into architecture groupings, known as virtual LANs (VLANs), which enable a selected number of computers to operate together in a subdivision. Each end node in the VLAN communicates only with the other member end nodes. Thus, if end nodes of the same switch are part of different VLANs, they will not be able to communicate with each other.

Figure 1:
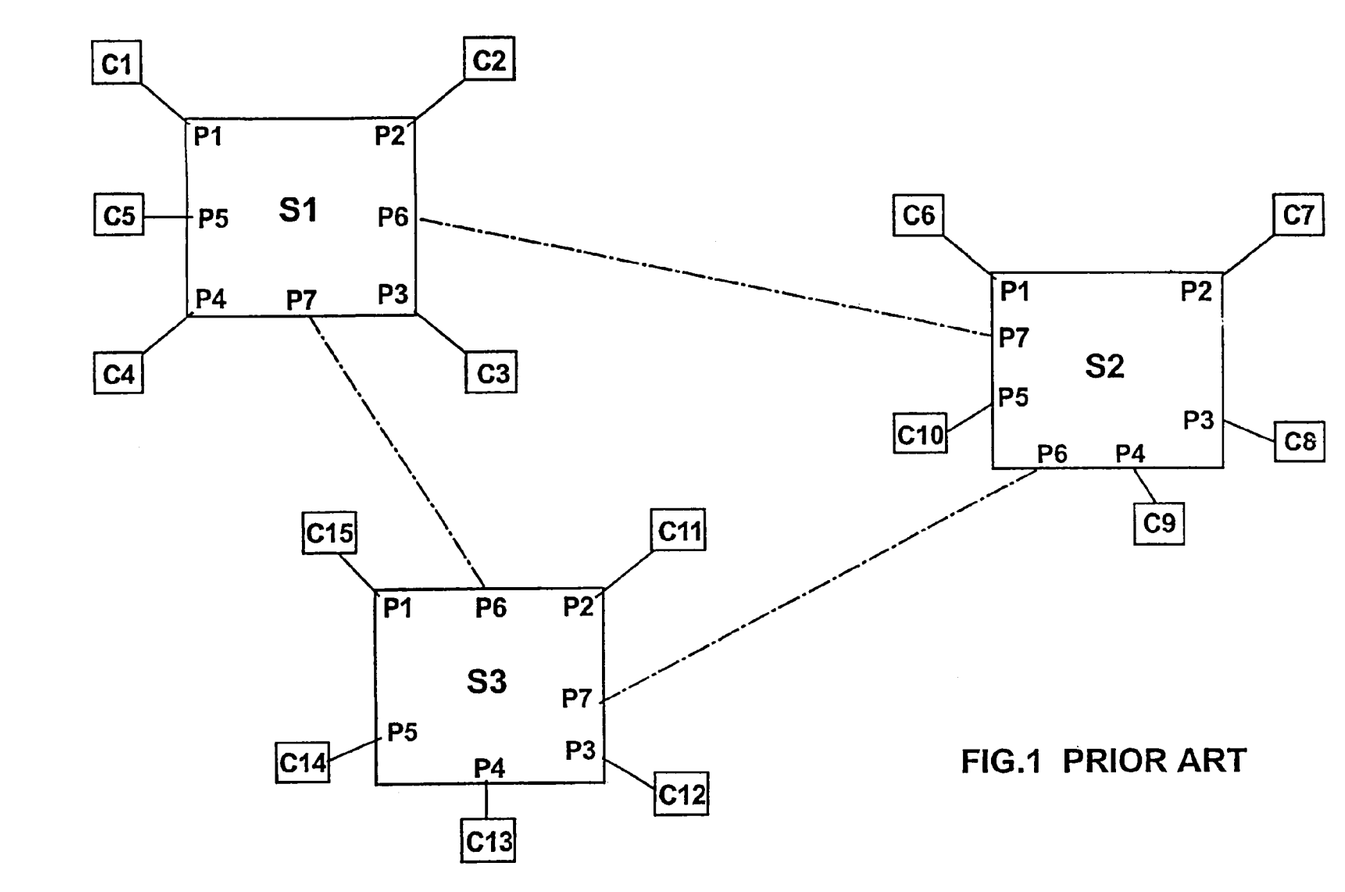
FIG. 1 is a schematic illustration of a local area network (LAN) of switches.
Figure 2:
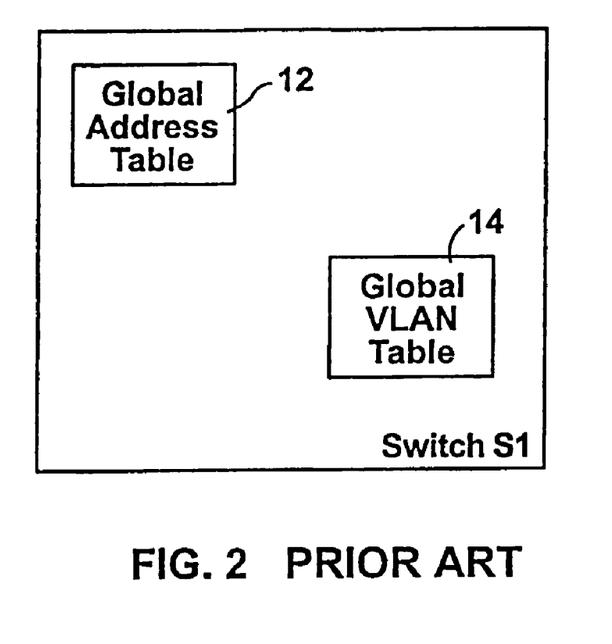
FIG. 2 is a schematic illustration of a prior art switch.
Figure 3:
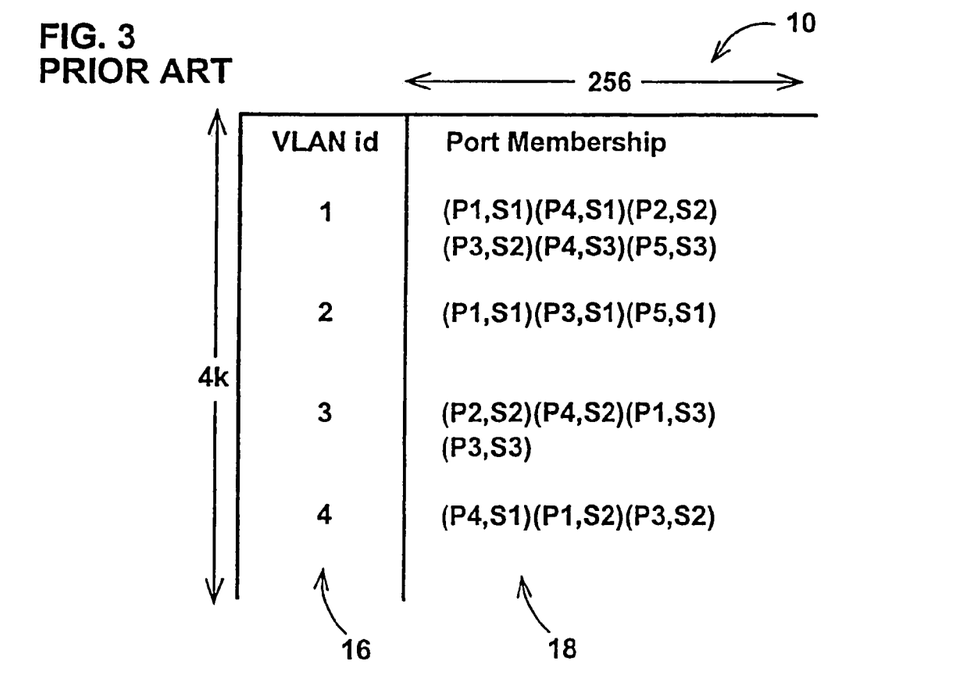
FIG. 3 is a schematic illustration of a prior art virtual LAN (VLAN) table associated with the network of FIG. 1.

Reference is now made to FIGS. 1, 2 and 3 which, respectively, illustrates a basic switching network, the table elements of one switch S1 and details of an associated VLAN table 10. The LAN comprises a multiplicity of computers C1–C15 connected together via a multiplicity of switches, S1, S2 and S3, each having a plurality of ports P1–P7. Each switch comprises ports P1 to P5 each of which connects to one of computers Ci, and ports P6 and P7, which connect to another switch.

Each computer has a MAC address within the network and each switch S includes a global address table 12 which lists each MAC address, its associated switch and port location and at least one of the VLANs to which it belongs. For example, computer C4 is located at (P4, S1); computer C7 is located at (P2, S2); and computer C14 is located at (P5, S3).

The VLAN addresses are additionally compiled in a global VLAN table 14, such as that shown in FIG. 2, which lists each VLAN id and its associated port members, where the port members are defined by at least the port and switch location. The VLAN table is generally 4K entries (VLAN ids) long and 256 bit (port members) wide, and each switch in the network has a copy of it. Consequently, each switch is able to draw from its associated VLAN table the address information of every end node in the network.

The exemplary global VLAN table of FIG. 3 applies to the network illustrated in FIG. 1 and lists the applicable VLAN ids 16 and their associated port members 18. As an example, VLAN id 1 comprises the end nodes located at (P1, S1), (P4, S1), (P2, S2), (P3, S2), (P4, S3) and (P5, S3): and VLAN id 12-2 comprises the end nodes located at (P1, S1), (P3, S1), and (P5, S1); and so on.

Generally, when a switch S receives a packet on a port P, the packet includes the source and destination MAC addresses as well as the VLAN id of the source and destination computers. The packet is submitted to two processes: learning and forwarding.

In the learning process, the switch S searches in the global address table 12 for the source MAC address, which is the MAC address of the port, which sent the packet, together with the VLAN id. If the source MAC address was previously learned for the VLAN id, then switch S will find the MAC address and VLAN id in global address table 12 and the switch S does not need to update table 12. However, if the source MAC address was not learned before, for that VLAN id, then the switch S verifies that the source port is a member of that VLAN, and if so, switch S will learn or update the MAC address with that VLAN id.

In the forwarding process, the switch S searches for the destination MAC address with the VLAN id in global address table 12. If the (destination MAC and VLAN id) address is not found, then the switch S sends the packet to all the members of the VLAN listed in the packet. To do so, switch S retrieves the membership of the VLAN id from global VLAN table 14 and forwards the packet to all the members of that VLAN.

If, on the other hand, the destination address and VLAN id are found, then the address table 12 contains the switch and port location for that station, and the packet is forwarded to that port (which may be on the same switch S or on another switch).

SUMMARY OF THE PRESENT INVENTION

It is an object of the present invention to provide a local VLAN tables per switch and a method for accessing VLAN addresses.

Applicants have realized that the VLAN table can be significantly reduced in size if only the local membership information is stored in full in the table while the information regarding other members is registered only as a listing of the switches to which they belong.

There is therefore provided, in accordance with a preferred embodiment of the present invention, a local virtual local area network (VLAN) table for a network switch.

The local VLAN table includes, for each VLAN identifier, local port membership on the network switch and switch membership per VLAN identifier. The local VLAN table also includes, per VLAN identifier, information regarding the local ports of said switch.

There is therefore provided, in accordance with a preferred embodiment of the present invention, a method of broadcasting a packet to the ports belonging to one VLAN of a network, whereas the network has multiple network switches. Each network switch has its own local ports and a local VLAN table. Each local VLAN table stores local port membership of its network switch, and switch membership per VLAN identifier. The local VLAN table is accessed with a VLAN identifier stored in the packet, to retrieve the local port membership and switch membership associated with the VLAN identifier. A copy of the packet is provided to each local port and to each switch retrieved from the local VLAN table.

Finally, there is therefore provided, a generally full-wire throughput, switching Ethernet controller for use within an Ethernet network of other switching Ethernet controllers. The Ethernet controllers are connected together by a bus. The controller includes a plurality of ports, including at least one bus port associated with ports connected to other switching Ethernet controllers.

The controller additionally includes a hash table, a hash table address control and a storage buffer.

The hash table stores MAC addresses and VLAN ids of ports within the Ethernet network.

The hash table address control hashes the MAC address and VLAN id of a packet to initial hash table location values. The hash table address control additionally changes the hash table location values by a fixed jump amount if the address and VLAN id values stored in the initial hash table location do not match the received address and VLAN id. Finally the hash table address control provides at least an output port number of the port associated with the received address and VLAN id.

The storage buffer includes a multiplicity of contiguous buffers in which to temporarily store the packet.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 4:
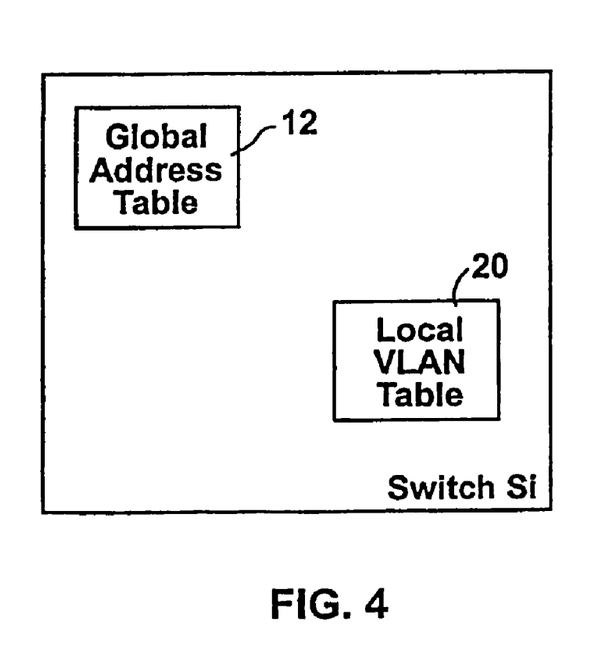
FIG. 4 is a schematic illustration of a switch, constructed and operative in accordance with a preferred embodiment of the present invention.
Figure 5A:
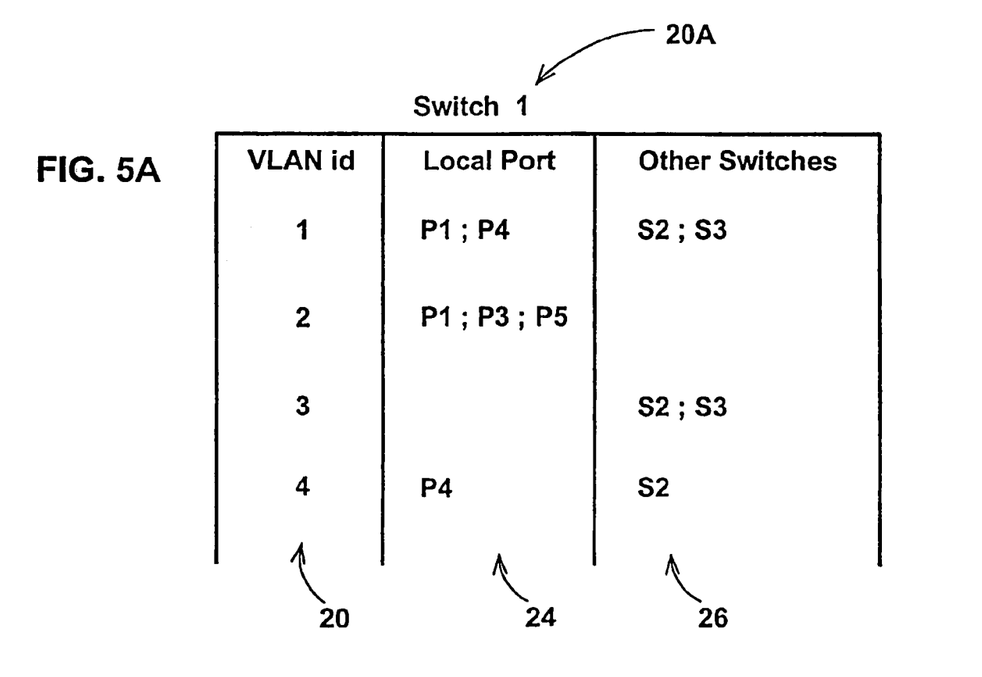
FIGS. 5A, 5B and 5C are schematic illustrations of local VLAN tables for three switches, constructed and operative in accordance with a preferred embodiment of the present invention.
Figure 5B:
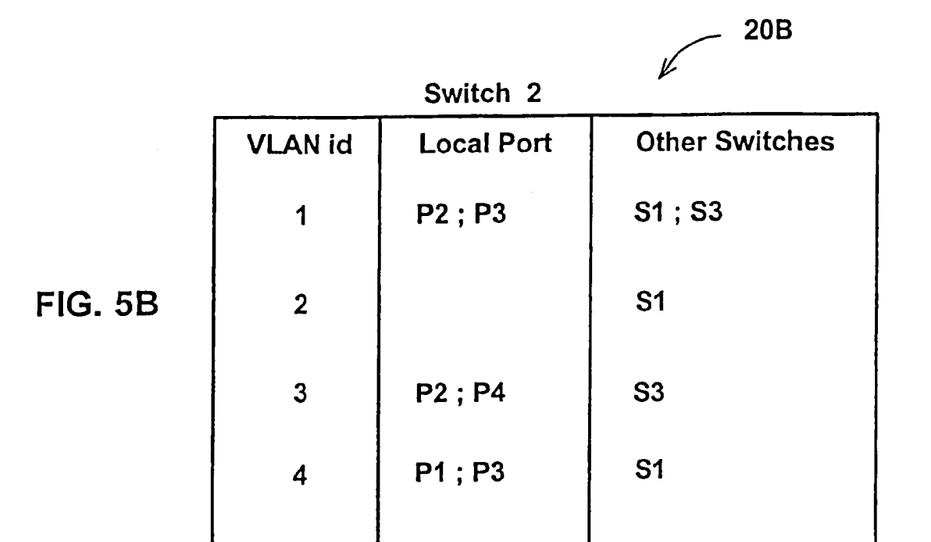
Figure 5C:
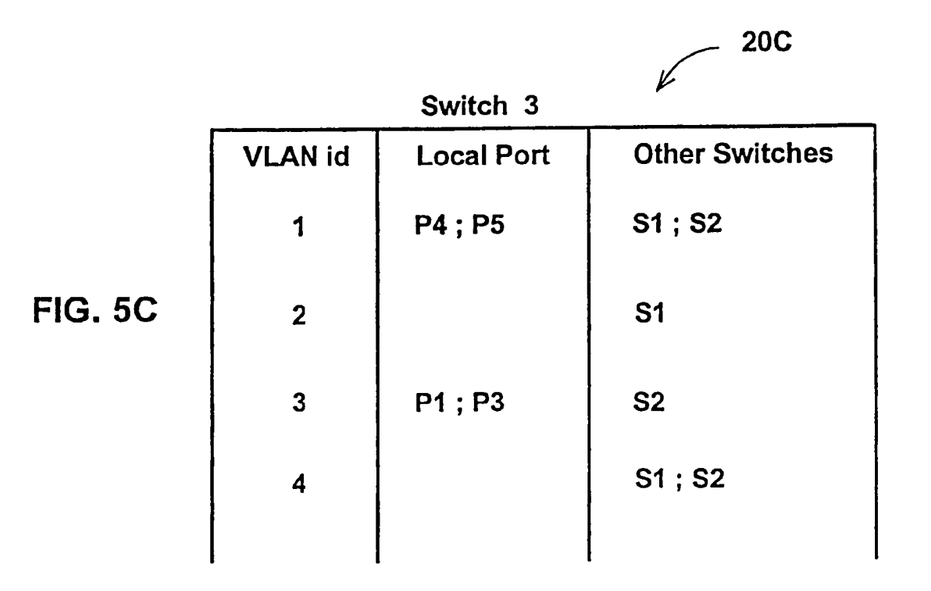

Reference is now made to FIG. 4 which illustrates a switch, constructed and operative in accordance with a preferred embodiment of the present invention, having local VLAN tables 20 and to FIGS. 5A, 5B and 5C which illustrate, in general terms, local VLAN tables 20A, 20B and 20C, respectively. FIGS. 5A, 5B and 5C are the local VLAN tables stored, in accordance with a preferred embodiment of the present invention, in switches S1, S2, and S3, respectively, of the network of FIG. 1.

As indicated in FIG. 4, each switch S has a global address table 12, as in the prior art. However, in accordance with a preferred embodiment of the present invention, each switch S replaces the global VLAN table of the prior art with a local VLAN table 20.

As shown in FIGS. 5A, 5B and 5C, each local VLAN table 20 lists the VLAN identifier (id) 22 of each VLAN, the local ports 24 belonging to that VLAN id and the other switches 26 of the network which also have ports belonging to that VLAN id. Other information about the local ports can also be stored per VLAN id.

The following discussion will use the VLAN memberships of FIG. 3 as an example. Thus, VLAN table 20A (FIG. 5A) of switch S1 lists that local ports P1 and P4 are members of VLAN 1, and that switches S2 and S3 also have ports, which are members of VLAN 1. Additionally, VLAN table 20A lists that local ports P1, P3 and P5 are members of VLAN 2. Since this is the complete list of members of VLAN 2, no other switches are listed in the other switches column 26. Furthermore, switch S1 does not have any local port members of VLAN 3; however, VLAN table 20A lists that switches S2 and S3 have members of that VLAN. Lastly, VLAN table 20A lists port P4 as a local member of VLAN 4 with remote members in switch S2.

VLAN tables 20B and 20C for switches S2 and S3, respectively, are similarly arranged. For example, VLAN tables 20B and 20C list no local ports for VLAN 2 but both indicate that switch S1 has members of that VLAN.

It will be appreciated that storing only the local port membership and the switch membership for remote ports reduces the size of the VLAN tables compared to the prior art. For example, the local port membership can be accommodated with 8 bits and the switch membership can be accommodated with 32 bits, instead of holding 8×32 bits or 256 bits per VLAN id as in the prior art.

It is noted that the operation of the present invention with the local VLAN tables 20 is similar to that described in the prior art, except for the operation when the destination address is not found. In this case, the switch S uses its local VLAN table 20 to forward the packet to all of its local ports P that are members of that VLAN, and to all the switches S that have member ports P. The receiving switches S will look up the port members for that VLAN and forward the packet to them.

Figure 6:
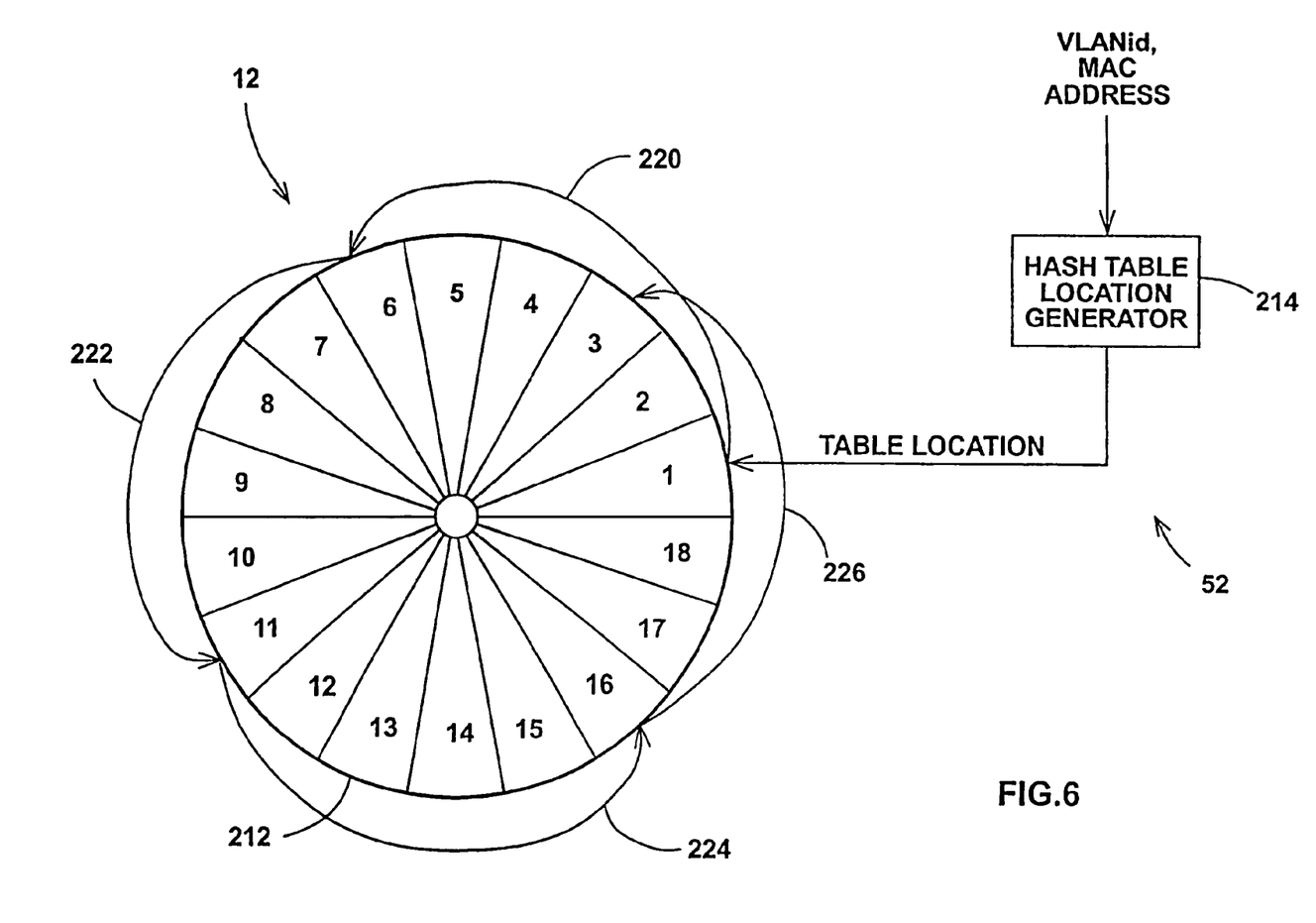
FIG. 6 is a schematic illustration of a hash table address recognition unit, constructed and operative in accordance with a preferred embodiment of the present invention.
Figure 7:
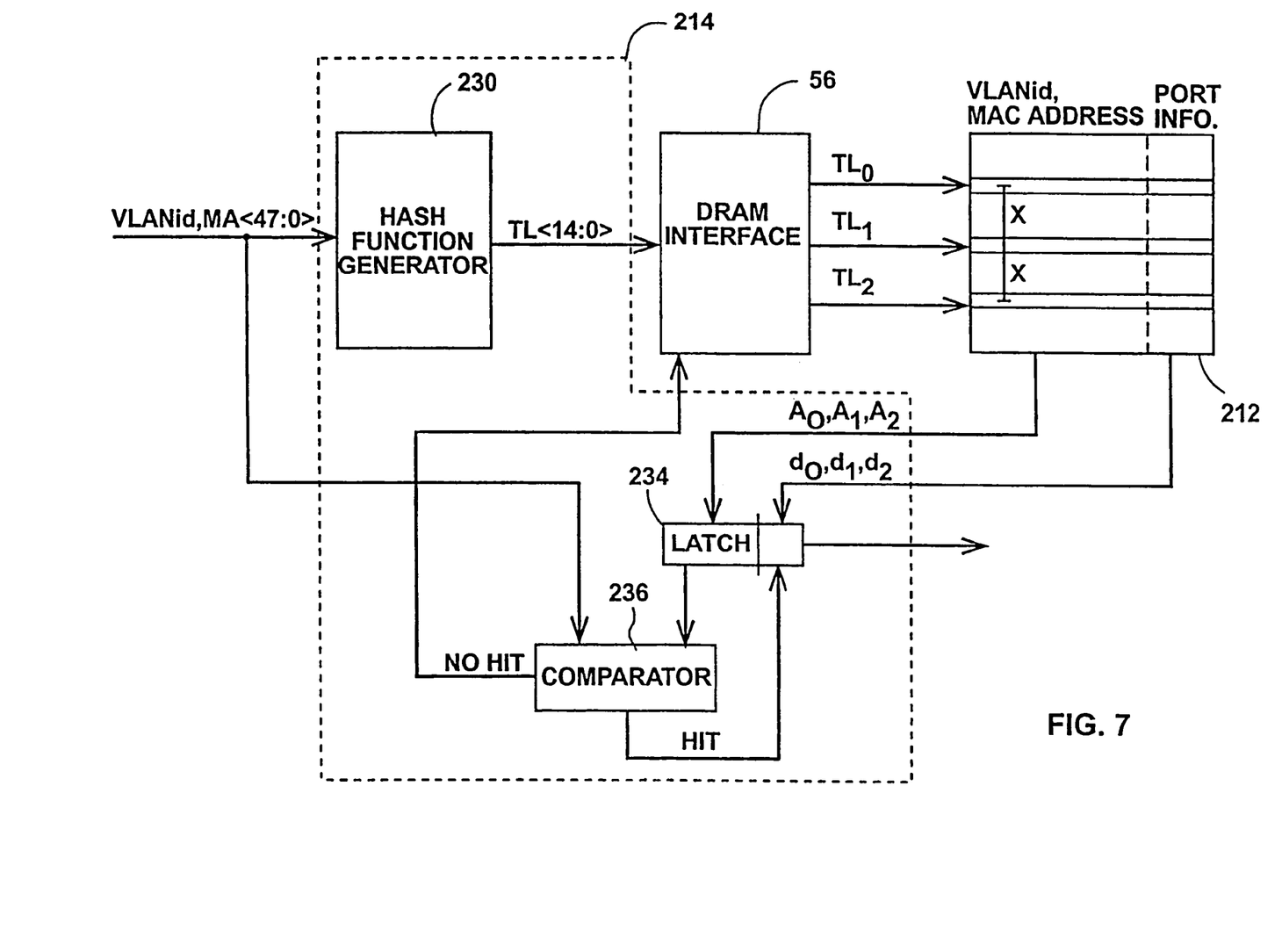
FIG. 7 is a block diagram illustration of the logic elements of the address recognition unit of FIG. 6.

Reference is now made to FIGS. 6 and 7, which illustrate a hash table control unit 52, which controls access to the address table 12 implemented as a hash table. FIG. 6 illustrates the hash table control unit 52 and its operation and FIG. 7 details the elements of unit 52. The term "location" will be utilized to refer to addresses within the hash table 212.

Hash table control unit 52 comprises a hash table 212 and a hash table location generator 214. Hash table 212 is shown with only 18 locations; it will be appreciated that this is for the purposes of clarity only. Typically, hash table 212 will have 48K locations therein and, in accordance with the present invention, each location stores one MAC address and its associated VLAN id and port.

Location generator 214 receives the VLAN Id and the MAC address, whether of the source end node or of the destination end node, and transforms that combined address, via a hash function, to a table location. The hash function can be any suitable hash function; two suitable functions are provided hereinbelow with respect to FIGS. 8 and 9.

In accordance with the present invention, if the generated table location stores a combined address which is not the same as the VLAN id and MAC address provided as input, the location generator 214 generates a second location which is X locations further down in the hash table 212. The hash table does not store any pointers to the next location. In accordance with the present invention, X is a prime number such that, if it is necessary to move through the entire hash table 212, each location will be visited only once during the review.

For example, and as shown in FIG. 6, X is 5 and the first table location is the location labeled 1. If the VLAN id and the MAC address of location 2 does not match that of the input VLAN id and MAC address, the location generator 214 "jumps" to location 6 (as indicated by arrow 220), and then to location 11 (arrow 222), and then to location 16 of the hash table 212 (arrow 224). Since there are only 18 locations in the hash table 212 of FIG. 6, location generator 214 then jumps to location 3 (arrow 226), which is (16+5) mod 18. If location 4 is also full, location generator 214 will generate locations until all of the locations of table 212 have been visited.

It will be appreciated that the hash table control unit 52 does not need to have pointers in table 212 pointing to the "next" location in the table. As a result, unit 52 knows, a priori, which locations in the table are next and can, accordingly, generate a group of locations upon receiving the VLAN id and the MAC address. If desired, the data in the group of locations can be read at once and readily compared to the input VLAN id and the MAC address.

FIG. 7 illustrates the elements of the location generator 214 and its operation in conjunction with the table 212. Location generator 214 comprises a hash function generator 230, DRAM interface 56 (since the hash table 212 is typically implemented in DRAM 20), a latch 234 and a comparator 236.

The hash function generator 230 converts a 48-bit combination of the VLAN id and the MAC address MA to the table location $TL_0$ of 15 bits. The DRAM interface 56 generates the group of next table locations $TL_0$, $TL_1$ and $TL_2$, where $TL_1=TL_0+X$ and $TL_2=TL_0+2X$, etc. It will be appreciated that FIG. 7 illustrates only three table locations but many more or many less can be generated at once, as desired.

DRAM interface 56 accesses the table 212 to read the addresses, $A_0$, $A_1$ and $A_2$, and their associated data $d_0$, $d_1$ and $d_2$, stored in table locations $TL_0$, $TL_1$ and $TL_2$, respectively. The data $d_i$ includes the necessary information about the address, such as the switch identification number and any other desired information. The read operation can be performed at once or successively.

The output of each table location is latched by latch 234. Comparator 236 then compares the address information $A_i$ with that of MAC address MA. If the two addresses match (i.e. a "hit"), then comparator 236 indicates to latch 234 to output the associated data $d_i$ stored therein. Otherwise, comparator 236 indicates to DRAM interface 56 to read the address $A_i$ and associated data $d_i$ stored in the next table location.

If many table locations are to be read at once, the location generator 214 can include a multiplicity of latches 234, one for each location to be read at once.

If one of the table locations is empty, as indicated by a valid bit of the data $d_i$, all locations after it will also be empty. Thus, the input VLAN id and MAC address have no corresponding stored address and therefore, the input VLAN id and MAC address is typically input into the empty table location. The valid bit in the associated data $d_i$ is then set to 'not empty'.

Figure 8:
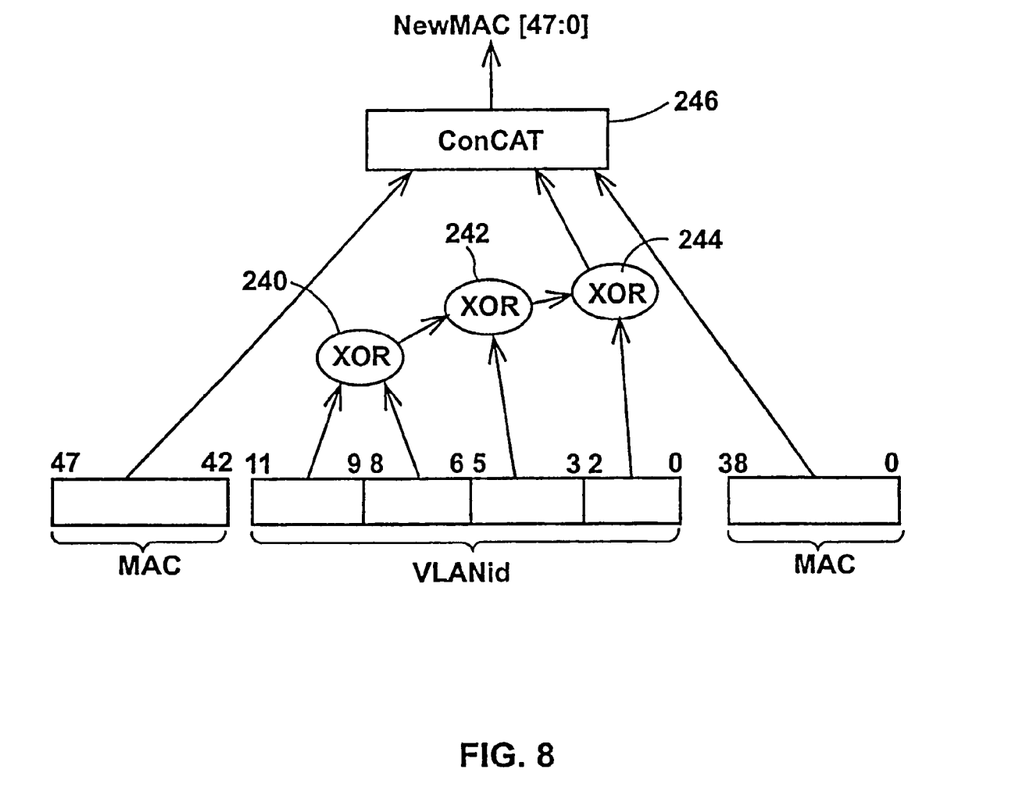
FIG. 8 is a schematic diagram of a function for creating a NEW MAC address which is a combination of the VLAN id and MAC address.
Figure 9:
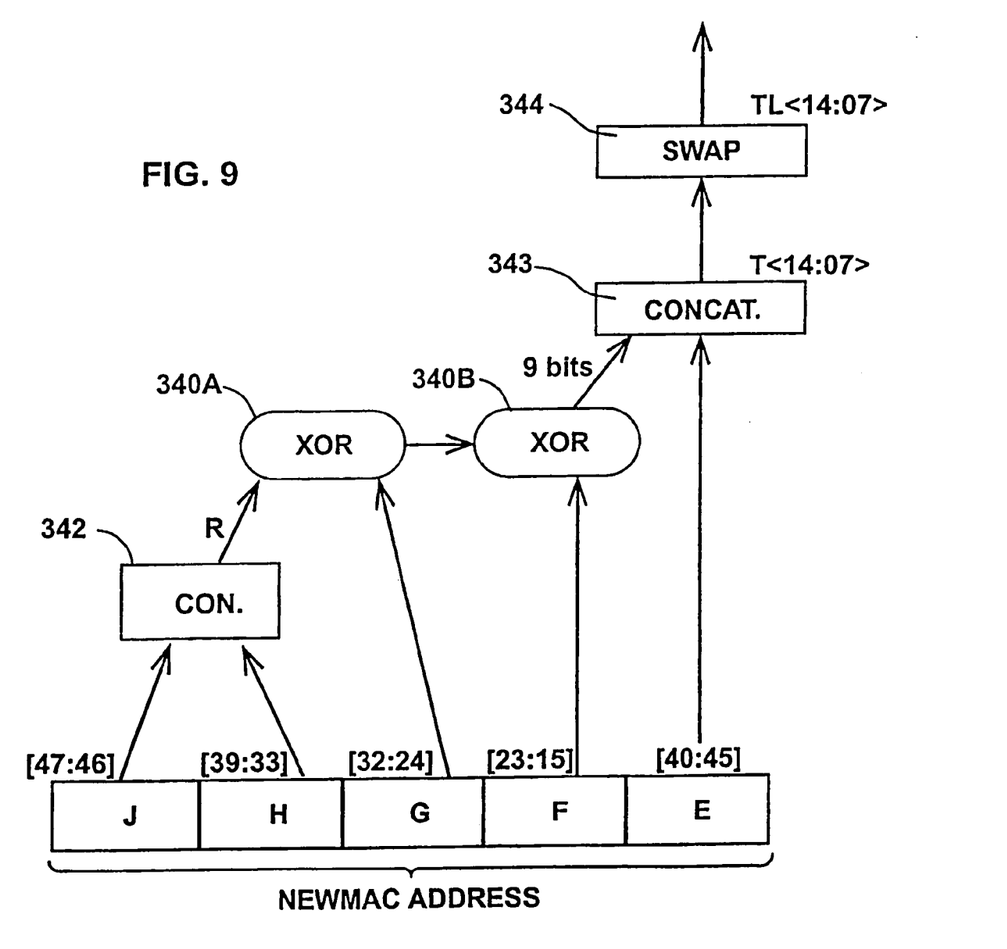
FIG. 9 is a schematic diagram of a hash function, useful in the address recognition unit of FIG. 6.

FIGS. 8 and 9, to which reference is now made, respectively illustrate a method for combining the VLAN id and MAC address into a "NEW MAC" address and an exemplary hash function, which can be performed by hash function generator 230.

As shown in FIG. 8, the VLAN id is divided into four sections of three bits. To create the NEW MAC address, generator 230 includes three exclusive OR units (XORs) 240, 244 and 246 and a concatenator 248. The result of the XORing, the output of XOR 246, is concatenated (in concatenator 248) with portions of the MAC address. The order of concatenation is: MAC[47:42]: output of XOR 246: MAC[38:0].

As shown in FIG. 9, generator 230 considers only the 33 highest significant bits (HSBs) of the NEW MAC address. The 33 HSBs are divided into five bytes, labeled E, F, G, H and J. Byte E consists of bits 40:45, byte F consists of bits 15:23, byte G consists of bits 24:32, byte H consists of bits 33:39 and byte J consists of bits 46:47. Bytes F and G both are of 9 bits, byte H is of 7 bits and byte J is of 2 bits.

Hash function generator 230 comprises two XOR units 340A and 340B, two concatenators 342 and 343 and a swap unit 344. The concatenator 342 concatenates the bytes J and H. The XOR unit 340A performs an exclusive OR between byte G and the output of concatenator 342. The XOR unit 340B performs an exclusive OR between the output of XOR unit 340A and byte F, thereby producing a variable of 9 bits. Concatenator 343 concatenates the output of XOR unit 240B with byte E, thereby producing variable T<14:07> of 8 bits. Swap unit 344 swaps the bits of variable T<14:07> to produce the output table location TL<14:07>. Thus, the value of TL<14> receives the value of T<07>, the value of TL<13> receives that of T<08>, etc.

Figure 10:
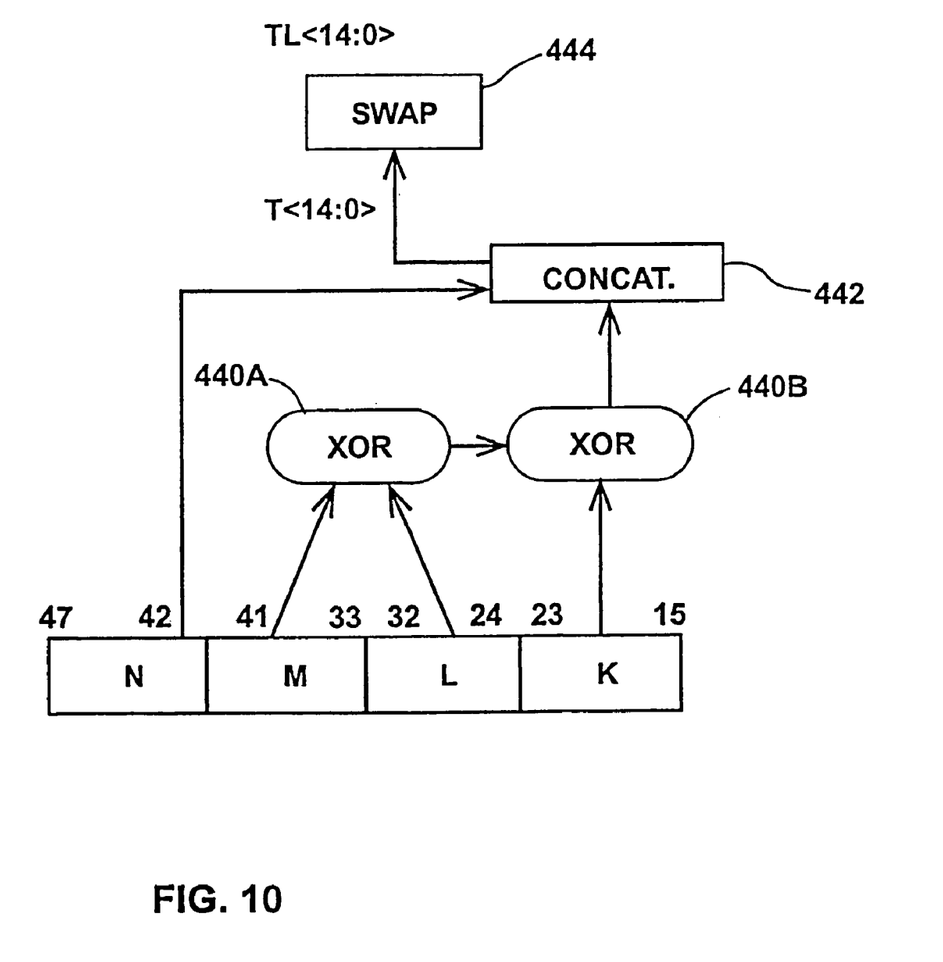
FIG. 10 is a schematic diagram of a hash function, useful in the address recognition unit of FIG. 6.

FIG. 10, to which reference is now made, illustrates another exemplary hash function, on the NEW MAC address, which can be performed by hash function generator 230. As in the previous embodiment, generator 230 considers only the 33 highest significant bits (HSBs) of the NEW MAC address. The 33 HSBs are divided into four bytes, labeled K, L, M and N. Byte K Consists of bits 15:23, byte L Consists of bits 24:32, byte M Consists of bits 33:41 and byte N Consists of bits 42:47. Thus, byte N is 6 bits and the remaining bytes are 9 bits.

For this embodiment, hash function generator 230 comprises two XOR units 440A and 440B, a concatenator 442 and a swap unit 444. The XOR unit 240A performs an exclusive OR between bytes L and M. The XOR unit 440B performs an exclusive OR between the output of XOR unit 440A and byte K. Concatenator 442 concatenates the output of XOR unit 440B with byte N, thereby producing variable T of 15 bits. As before, swap unit 444 swaps the bits of variable T to produce the output table location TL.

It will be appreciated that any hash function can be utilized. However, the desired hash functions are those, which provide a uniform distribution of table locations for the expected MAC addresses. It is noted that the above hash function is easily implemented in hardware since XOR units and concatenators are simple to implement.

It will be appreciated by persons skilled in the art that the present invention is not limited by what has been particularly shown and described herein above. Rather the scope of the invention is defined by the claims that follow:

What is claimed is:

1. A local virtual local area network (VLAN) table for a network switch, the table comprising, for each VLAN identifier:
   a local port membership on said network switch per VLAN identifier to the exclusion of remote port membership; and
   a switch membership per VLAN identifier.

2. A local VLAN table according to claim 1 and also comprising, per VLAN identifier, information regarding the local ports of said switch.

3. A method of broadcasting a packet to the ports belonging to one VLAN of a network having multiple network switches, wherein each network switch has its own local ports, the method comprising the steps of:
   having one local VLAN table per network switch, wherein each local VLAN table stores local port membership of its network switch to the exclusion of remote port membership and switch membership per VLAN identifier;
   accessing said local VLAN table with a VLAN identifier stored in said packet to retrieve the local port membership and switch membership associated with said VLAN identifier;
   providing a copy of said packet to each local port and to each switch retrieved from said local VLAN table.

4. A generally full-wire throughput, switching Ethernet controller for use within an Ethernet network of other switching Ethernet controllers connected together by a bus, the controller comprising:
   a plurality of ports including at least one bus port associated with ports connected to other switching Ethernet controllers;
   a hash table for storing MAC addresses and VLAN ids of ports within said Ethernet network;
   a hash table address control for hashing the MAC address and VLAN id of a packet to initial hash table location values, for changing the hash table location values by a fixed jump amount if the address and VLAN id values stored in said initial hash table location do not match the received address and VLAN id, and for providing at least an output port number of the port associated with the received address and VLAN id; a storage buffer including a multiplicity of contiguous buffers in which to temporarily store said packet.

5. A network switch arranged to communicate with a plurality of network devices including at least a second network switch comprising:
   a plurality of local ports arranged to communicate with the plurality of network devices,
   wherein the at least second network switch comprises a plurality of remote ports;
   a local virtual local area network (VLAN) memory to store an identification of at least a corresponding one of said plurality of local ports to the exclusion of identification of remote ports and an identification of at least a respective VLAN, and
   an identification of at least a respective VLAN identification, and an identification of the at least second network switch.

6. A network switch arranged to communicate with a plurality of network devices including at least a second network switch comprising:
   a plurality of local ports means arranged for communicating with the plurality of network devices, wherein the at least second network switch comprises a plurality of remote ports;
   a local virtual local area network (VLAN) memory means for storing an identification of at least a corresponding one of said plurality of local ports means to the exclusion of identification of remote port means for communicating with the plurality of network devices and an identification of at least a respective VLAN, and
   an identification of at least a respective VLAN identification and an identification of the at least second network switch.

7. A method of identifying VLAN's in a network switch arranged to communicate with a plurality of network devices including at least a second network switch comprising:
   storing an identification of at least a corresponding one of a plurality of local ports of said network switch to the exclusion of identification of remote ports and an identification of at least a respective VLAN, and
   storing an identification of at least a respective VLAN identification and an identification of the at least second network switch.

8. A local virtual local area network (VLAN) data structure in a network switch arranged to communicate with a plurality of network devices including at least a second network switch, said data structure comprising:
   an identification of at least a corresponding one of a plurality of local ports of the network switch to the exclusion of identification of remote ports and an identification of at least a respective VLAN, and
   an identification of at least a respective VLAN identification and an identification of the at least second network switch.

9. A network switch for a network that includes a plurality of remote switches each having a respective switch identification (ID), comprising:
   a plurality of local ports each having a local port identification (ID); and
   memory that is accessed by said network switch to forward packets and that stores:
   a first relationship between a plurality of virtual local area network (VLAN) IDs and corresponding local port IDs to the exclusion of remote port IDs; and
   a second relationship between said plurality of VLAN IDs and said switch IDs corresponding to said plurality of VLAN IDs.

10. The network switch of claim 9 wherein said memory also stores destination addresses corresponding to at least one of said VLAN IDs, said local port IDs and said switch IDs.

11. The network switch of claim 10 wherein when said network switch receives said packet including a VLAN ID and a destination address that is not found in said table, said network switch forwards said packet to said local ports of said network switch with said VLAN ID and to all of said switches having said switch IDs that correspond to said VLAN ID identified in said packet.

12. A network switch for a network that includes a plurality of remote switches each having switch identifications (IDs), comprising:
   a plurality of local port means for receiving packets, wherein each of said local port means has a local port means identification (ID); and storing means, that is accessed by said network switch to forward packets, for storing:

a first relationship between a plurality of virtual local area network (VLAN) IDs and local port means IDs to the exclusion of identification of remote port means for receiving packets; and a second relationship between said plurality of VLAN IDs and said switch IDs corresponding to respective ones of said plurality of VLAN IDs.

13. The network switch of claim 12 wherein said storing means also stores destination addresses corresponding to at least one of said VLAN IDs, said local port means IDs and said switch IDs.

14. The network switch of claim 13 wherein when said network switch receives a packet including a VLAN ID and a destination address that is not found in said storing means, said network switch forwards said packet to said local port means of said network switch with said VLAN ID and to all of said switches having said switch IDs that correspond to said VLAN ID identified in said packet.

15. A method for operating a network switch for a network that includes a plurality of remote switches each having switch identifications (IDs), comprising:

providing a plurality of local ports each having a local port identification (ID);

storing a first relationship between a plurality of virtual local area network (VLAN) IDs and local port IDs to the exclusion of remote port IDs;

storing a second relationship between said plurality of VLAN IDs and said switch IDs corresponding to respective ones of said plurality of VLAN IDs; and forwarding packets based on said first and second relationships.

16. The method of claim 15 further comprising storing destination addresses corresponding to at least one of said VLAN IDs, said local port IDs and said switch IDs.

17. The network switch of claim 16 further comprising:

receiving a packet at said network switch including a VLAN ID and a destination address that is not found in said table;

forwarding said packet to said local ports of said network switch with said VLAN ID; and forwarding said packet to remote switches having said switch IDs that correspond to said VLAN ID identified in said packet.

\* \* \* \* \*